(12) United States Patent
Sato et al.

(10) Patent No.: US 12,091,584 B2
(45) Date of Patent: Sep. 17, 2024

(54) PACKAGING MATERIAL

(71) Applicant: SAKATA INX CORP., Osaka (JP)

(72) Inventors: Yoichi Sato, Osaka (JP); Kazuki Moriyasu, Osaka (JP); Eri Ueda, Osaka (JP); Takaaki Sano, Osaka (JP)

(73) Assignee: SAKATA INX CORP., Osaka (JP)

( * ) Notice: Subject to any disclaimer, the term of this patent is extended or adjusted under 35 U.S.C. 154(b) by 241 days.

(21) Appl. No.: 17/636,273

(22) PCT Filed: Jul. 1, 2020

(86) PCT No.: PCT/JP2020/025826
§ 371 (c)(1),
(2) Date: Feb. 17, 2022

(87) PCT Pub. No.: WO2021/039103
PCT Pub. Date: Mar. 4, 2021

(65) Prior Publication Data
US 2022/0298398 A1    Sep. 22, 2022

(30) Foreign Application Priority Data

Aug. 29, 2019 (JP) .................................. 2019-157157

(51) Int. Cl.
*C09J 175/06* (2006.01)
*B65D 65/40* (2006.01)

(52) U.S. Cl.
CPC ............ *C09J 175/06* (2013.01); *B65D 65/40* (2013.01); *C09J 2301/12* (2020.08); *C09J 2423/101* (2013.01); *C09J 2423/106* (2013.01); *C09J 2431/003* (2013.01); *C09J 2467/003* (2013.01); *C09J 2467/006* (2013.01)

(58) Field of Classification Search
CPC .................. C09J 175/06; C09J 2301/12; C09J 2423/101; B65D 65/40; B32B 15/20
See application file for complete search history.

(56) References Cited

U.S. PATENT DOCUMENTS

| | | | |
|---|---|---|---|
| 2014/0106140 A1 | 4/2014 | Keda et al. | |
| 2020/0392360 A1* | 12/2020 | Sato | ........................ B32B 27/32 |

FOREIGN PATENT DOCUMENTS

| | | | | |
|---|---|---|---|---|
| DE | 4030646 A | * | 4/1992 | ............... B32B 1/02 |
| JP | 53-71182 | | 6/1978 | |
| JP | 4-178418 | | 6/1992 | |
| JP | 8-058013 | | 3/1996 | |
| JP | 2002-273812 | | 9/2002 | |
| JP | 2010-006083 | | 1/2010 | |
| JP | 2012-228846 | | 11/2012 | |
| JP | 2012228846 A | * | 11/2012 | |
| JP | 2012-250416 | | 12/2012 | |
| JP | 2012250416 A | * | 12/2012 | |
| JP | 2013-001755 | | 1/2013 | |
| JP | 2013-022910 | | 2/2013 | |
| JP | 2013-001775 | | 7/2013 | |
| JP | 2016-087894 | | 5/2016 | |
| JP | 2017-088646 | | 5/2017 | |
| JP | 2017-154324 | | 9/2017 | |
| JP | 2019-112504 | | 7/2019 | |
| JP | 2019112504 A | * | 7/2019 | .......... B41M 5/0023 |

* cited by examiner

*Primary Examiner* — Daniel McNally
(74) *Attorney, Agent, or Firm* — HSML P.C.

(57) ABSTRACT

The present invention aims to provide a packaging material having excellent printed image quality as well as excellent laminate strength and heat sealability. Provided is a packaging material including at least: a base film, a primer layer, a printed layer, an adhesive layer, and a sealant film in a stated order, the primer layer being formed of a primer composition containing a water-soluble polyvalent metal salt, a chlorinated polyolefin emulsion, and at least one selected from the group consisting of an acrylic emulsion, a vinyl acetate emulsion, and a urethane-modified polyester resin, the printed layer being formed of a printing ink containing a polyester polyurethane resin, the adhesive layer being formed of an aliphatic ester adhesive.

4 Claims, No Drawings

PACKAGING MATERIAL

TECHNICAL FIELD

The present invention relates to a packaging material.

BACKGROUND ART

In the field of packaging materials for food packaging or the like, an attention has been recently paid to inkjet printing for the purpose of efficiently adapting to a decrease in lot size and an increase in product variety.

Normally, packaging materials for food packaging or the like are produced as follows. Images or letters are printed on a base film serving as a printing substrate, for example, with an aqueous inkjet ink composition to form a printed surface. Next, a hot-melt sealant film is attached directly to the printed surface using an adhesive, or attached after other function layer(s) are laminated, whereby, a composite film is produced.

As such a packaging material usable for food packaging, Patent Literature 1 discloses a laminate for flexible packaging including: a flexible packaging material (a): an inkjet receiving layer (b); a printed layer (c); an adhesive layer (d); and a sealant film layer (e), the inkjet receiving layer (b) being formed on a surface of the flexible packaging material (a), the printed layer (c) being formed on the inkjet receiving layer (b) using an aqueous inkjet recording ink containing a pigment and a resin, the adhesive layer (d) being formed on the printed layer (c), the sealant film layer (e) being formed on the adhesive layer (d) by laminate processing including laminating a molten or film-shaped polymer for flexible packaging, wherein the flexible packaging material has a thickness of 10 to 100 μm, and the receiving layer has a thickness of 2 to 20 μm.

Patent Literature 2 discloses a method for producing a laminate, including: forming a printed layer on a nonabsorbable substrate by inkjet recording using an inkjet recording ink; forming an adhesive layer on the printed layer; and laminating a sealant film layer on the adhesive layer surface, the inkjet recording ink being prepared by blending a pigment (a) and an aqueous resin (b) at a specific ratio, the aqueous resin (b) being a polyurethane resin produced through a reaction with a chain extender.

Patent Literature 3 discloses a method for producing a laminate, including: forming a printed layer on a nonabsorbable substrate by inkjet recording using an aqueous inkjet recording ink for lamination; forming an adhesive layer on the printed layer; and laminating a sealant film layer on the adhesive layer surface, the aqueous inkjet recording ink for lamination containing a pigment (a) and an aqueous resin (b) which contains an aqueous polyurethane resin (b-1) produced through a reaction with a chain extender composed of a hydrazine derivative and a carbonyl or amide group-containing acrylic copolymer (b-2).

CITATION LIST

Patent Literature

Patent Literature 1: JP 2012-250416 A
Patent Literature 2: JP 2013-001755 A
Patent Literature 3: JP 2013-001775 A

SUMMARY OF INVENTION

Technical Problem

In the field of packaging materials, use of oriented or cast polypropylene films, oriented or cast polyester films, polypropylene films including an inorganic oxide-deposited layer, or the like as a base film or a sealant film has been considered in order to impart gas barrier properties and laminate strength.

However, these materials are normally not likely to impart excellent printed image quality, laminate strength, and heat sealability.

Accordingly, in the case where any of these materials is used in a packaging material having a conventional structure, the packaging material cannot have sufficient printed image quality, sufficient laminate strength between the base film and the sealant film, and sufficient heat sealability, which may cause various problems. For example, the base film may separate from the printed layer formed of a printing ink during processes such as food packing, transportation, and display, resulting in breaking of the packaging container. For another example, the packaging container cannot be opened because trying to open the container may cause what is called a "double bag state", in which the base film on the outside is opened while the sealant film on the inside remains unopened.

Solution to Problem

The present inventors focused on the structures of layers including a printed layer formed with a printing ink, a primer layer provided between a base film and the printed layer, and an adhesive layer provided between the printed layer and a sealant film, and made intensive studies thereon.

As a result, they found out that use of a combination of specific materials for each of the printed layer, the primer layer, and the adhesive layer can provide a packaging material having excellent printed image quality as well as excellent laminate strength and heat sealability even in a case where the materials not likely to impart properties such as excellent printed image quality and laminate strength are used. Thus, the present invention was completed.

Specifically, the present invention relates to a packaging material including at least: a base film; a primer layer; a printed layer; an adhesive layer; and a sealant film in a stated order, the primer layer being formed of a primer composition containing a water-soluble polyvalent metal salt, a chlorinated polyolefin emulsion, and at least one selected from the group consisting of an acrylic emulsion, a vinyl acetate emulsion, and a urethane-modified polyester resin, the printed layer being formed of a printing ink containing a polyester polyurethane resin, the adhesive layer being formed of an aliphatic ester adhesive.

The aliphatic ester adhesive preferably contains a urethane bond.

The base film is preferably a polypropylene film or a polyester film.

The sealant film is preferably an aluminized polypropylene film.

Advantageous Effects of Invention

The present invention can provide a packaging material having excellent printed image quality as well as excellent laminate strength and heat sealability even in a case where the materials not likely to impart properties such as excellent printed image quality, laminate strength, and heat sealability to conventional packaging materials are used.

The packaging material of the present invention is described hereinbelow.

The packaging material of the present invention includes at least a base film, a primer layer, a printed layer, an adhesive layer, and a sealant film in the stated order.

<Base Film>

The base film is a film formed of a thermoplastic resin. Examples of the thermoplastic resin include polyethylene, polypropylene, an ethylene-vinyl acetate copolymer, polyester (e.g., polyethylene terephthalate, polybutylene terephthalate), Nylon 6, Nylon 6,6, polyvinyl chloride, and polyvinylidene chloride.

The base film is preferably uniaxially or biaxially oriented in order to favorably impart penetration strength and transparency.

The stretch ratio in MD (machine direction of the film) and TD (direction perpendicular to the machine direction of the film) is preferably three to six times, for example.

The base film is preferably a polypropylene film or a polyester film because they have shine, high transparency, and excellent resistance properties, and exhibit good printing coloration. More preferred is a uniaxially or biaxially oriented polypropylene or polyester film.

The base film is preferably subjected to treatment such as plasma treatment or corona discharge treatment so as to increase the adhesion to a primer composition described later and the wettability.

The base film may have any thickness. The thickness may be, for example, 10 to 100 μm.

<Primer Layer>

The primer layer is formed of a primer composition containing a water-soluble polyvalent metal salt, a chlorinated polyolefin emulsion, and at least one selected from the group consisting of an acrylic emulsion, a vinyl acetate emulsion, and a urethane-modified polyester resin.

Examples of the water-soluble polyvalent metal salt include dissociable salts of alkaline earth metals such as Ca and Mg. Specific examples thereof include: calcium salts such as calcium nitrate, calcium chloride, calcium hydroxide, calcium acetate, and calcium formate; and magnesium salts such as magnesium chloride, magnesium hydroxide, magnesium acetate, and magnesium sulfate.

Preferred among these in terms of solubility in water or reactivity with ink are calcium salts, and more preferred are calcium nitrate, calcium chloride, calcium hydroxide, calcium acetate, and calcium formate.

The amount of the water-soluble polyvalent metal salt is not limited. In order to improve the printed image quality of a printed layer described later and in order to obtain good water resistance, the amount of the water-soluble polyvalent metal salt in terms of solid content is preferably 0.5 to 10% by mass, more preferably 1 to 5% by mass in the primer composition. One water-soluble polyvalent metal salt may be used alone or two or more water-soluble polyvalent metal salts may be used in combination.

The chlorinated polyolefin emulsion is obtained by chlorinating a polyolefin resin and emulsifying the resulting chlorinated polyolefin resin with an emulsifier or the like.

To enhance properties such as storage stability, the chlorinated polyolefin is preferably acid-modified with an acid such as maleic acid (anhydride). In this case, a basic compound is preferably further added to the system.

Examples of the polyolefin resin include polypropylene resins and polyethylene resins.

The degree of chlorination (chlorine content) is preferably 1 to 40% by mass, more preferably 10 to 30% by mass relative to the entire resin.

A polyolefin resin having a degree of chlorination of higher than 40% by weight may itself have high polarity, and thus may tend to reduce adhesion to non-polar films such as polyolefin films when added to a primer composition.

One chlorinated polyolefin emulsion may be used alone, or two or more chlorinated polyolefin emulsions may be used in combination.

The amount of the chlorinated polyolefin emulsion is not limited. In order to achieve better adhesion to the printed layer and higher storage stability of the primer composition, the amount of the chlorinated polyolefin emulsion in terms of solid content is preferably 0.5 to 10% by mass, more preferably 1 to 5% by mass in the primer composition.

The chlorinated polyolefin emulsion preferably has good stability even in the presence of the water-soluble polyvalent metal salt.

The acrylic emulsion preferably has good stability even in the presence of the water-soluble polyvalent metal salt. Examples of such an acrylic emulsion include an acrylic emulsion, a styrene-acrylic emulsion, an acrylic-vinyl acetate emulsion, an acrylic-vinyl chloride emulsion, an acrylic-silicone emulsion, and an acrylic-colloidal silica emulsion.

In order to impart excellent laminate strength (herein, the term "laminate strength" means peel strength between the base film and the sealant film, unless otherwise specified), the acrylic emulsion has a glass transition temperature of more preferably −20° C. to 50° C., still more preferably 0° C. to 40° C., particularly preferably 10° C. to 30° C.

The acrylic-vinyl acetate emulsion is also included in the below vinyl acetate emulsion.

The vinyl acetate emulsion preferably has good stability even in the presence of the water-soluble polyvalent metal salt. Examples of such a vinyl acetate emulsion include those obtained by emulsifying, for example, vinyl acetate, a vinyl acetate-vinyl alcohol copolymer obtained by partially saponifying vinyl acetate, a vinyl chloride-vinyl acetate copolymer, or an α-olefin-vinyl acetate copolymer using an emulsifier or the like.

Examples of the emulsifier include anionic emulsifiers such as fatty acid soap, rosin acid soap, an alkylsulfonate, a dialkylarylsulfonate, an alkylsulfosuccinate, a polyoxyethylene alkyl sulfate, and a polyoxyethylene alkylarylsulfurate. If necessary, the anionic emulsifier may be combined with a known emulsifier such as a nonionic emulsifier including a polyoxyethylene alkyl ether, a polyoxyethylene alkyl aryl ether, and a polyoxyethylene oxypropylene block copolymer.

In order to impart excellent laminate strength, the vinyl acetate emulsion preferably has a glass transition temperature of 0° C. to 50° C.

The urethane-modified polyester resin preferably has good stability even in the presence of the water-soluble polyvalent metal salt.

Such a urethane-modified polyester resin can be obtained, for example, by reacting a polyester resin containing two or more functional groups (e.g., hydroxy group) in the molecule with a polyisocyanate compound.

The polyester resin used and the polyisocyanate compound used each may be one mentioned for a polyester polyurethane resin described later.

In order to impart excellent laminate strength, the urethane-modified polyester resin has a glass transition temperature of more preferably −55° C. to 50° C., still more preferably −55° C. to 10° C., particularly preferably −55° C. to −20° C., most preferably −55° C. to −30° C.

The amount of the at least one selected from the group consisting of an acrylic emulsion, a vinyl acetate emulsion, and a urethane-modified polyester resin is not limited. In order to impart excellent laminate strength and in terms of the storage stability of the primer composition, the amount of the at least one selected from the group consisting of an acrylic emulsion, a vinyl acetate emulsion, and a urethane-modified polyester resin in terms of slid content is preferably 0.5 to 10% by mass, more preferably 1 to 5% by mass in the primer composition.

The primer composition may contain optional component(s), if necessary. Examples of optional components include water-soluble organic solvents such as monoalcohols, polyalcohols, lower alkyl ethers of polyalcohols, ketones, ethers, esters, nitrogen-containing compounds; and various additives such as acetylene diol and derivatives thereof, silicone surfactants, fluorine surfactants, hindered amine preservability improvers, ultraviolet absorbers, antioxidants, and defoamers.

The primer composition may be produced by any method. It may be produced by a method including adding, to water, the water-soluble polyvalent metal salt, the chlorinated polyolefin emulsion, and the at least one selected from the group consisting of an acrylic emulsion, a vinyl acetate emulsion, and a urethane-modified polyester resin, and optionally a water-soluble organic solvent and various additives, and stirring and mixing them with a high-speed stirrer such as a disperser.

The primer composition may be applied by an application method using an inkjet printer or any of other various application devices such as a roll coater, a bar coater, a spray coater, or a gravure coater.

In order to impart sufficient laminate strength, the resulting primer layer has a thickness of preferably 0.01 to 1 μm, more preferably 0.05 to 0.8 μm.

<Printed Layer>

The printed layer is formed of a printing ink containing a polyester polyurethane resin.

(Polyester Polyurethane Resin)

The polyester polyurethane resin can be obtained by reacting a polyester resin containing two or more functional groups (e.g., hydroxy group) in the molecule with a polyisocyanate compound.

The polyester resin can be obtained by esterification using a polycarboxylic acid and a polyalcohol as raw material components.

Examples of the polycarboxylic acid include phthalic acid, isophthalic acid, tetrahydrophthalic acid, tetrahydroisophthalic acid, hexahydrophthalic acid, hexahydroterephthalic acid, trimellitic acid, adipic acid, sebacic acid, succinic acid, azelaic acid, fumaric acid, maleic acid, itaconic acid, pyromellitic acid, and acid anhydrides of these. These polycarboxylic acids may be used alone or in combination of two or more.

Examples of the polyalcohol include glycols and trivalent or higher alcohols. Examples of the glycols include ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butanediol, 1,4-butanediol, 1,5-pentanediol, 1,6-hexanediol, 2-butyl-2-ethyl-1,3-propanediol, methyl propanediol, cyclohexane dimethanol, and 3,3-diethyl-1,5-pentanediol. Examples of the trivalent or higher alcohols include glycerin, trimethylolethane, trimethylolpropane, pentaerythritol, and dipentaerythritol. These polyalcohols may be used alone or in combination of two or more.

Examples of the polyisocyanate compound include: aromatic diisocyanates such as 4,4'-diphenylmethane diisocyanate, 2,4- or 2,6-tolylene diisocyanate, 1,5-naphthalene diisocyanate, and p- or m-phenylene diisocyanate; alicyclic diisocyanates such as isophorone diisocyanate, 4,4'-dicyclohexylmethane diisocyanate, 1,4-cyclohexylene diisocyanate, and hydrogenated tolylene diisocyanate; aliphatic diisocyanates such as hexamethylene diisocyanate; xylylene diisocyanate; and m-tetramethylxylylene diisocyanate.

These polyisocyanate compounds may be used alone or in combination of two or more.

Among these, preferred is a reaction product of reaction components including at least one selected from the group of polyester diol compounds represented by the following formula (1), hexamethylene diisocyanate, and an acid group-containing diol compound:

[Chem. 1]

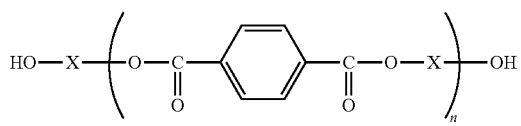

wherein Xs are each independently a hydrocarbon group represented by —CH$_2$—CH$_2$—CH$_2$—CH$_2$—CH$_2$—CH$_2$— or —CH$_2$—CH$_2$—CH(CH$_3$)—CH$_2$—CH$_2$—, and n is an integer of 2 to 20.

Use of such a polyester polyurethane resin presumably brings the following three advantages: (1) such a polyester polyurethane resin has excellent solubility or self-emulsification stability in an aqueous medium; (2) the resulting printing ink can dissolve the primer layer to form one integrated layer from the printed layer and the primer layer, resulting in excellent laminate strength owing to the presence of the adsorption sites to the base film which include both the adsorption sites having been contained in the printed layer and the adsorption sites having been contained in the primer layer; (3) the printed layer can have excellent flexibility to follow the change of the shape of the base film.

Examples of the acid group-containing diol compound include carboxy group-containing diol compounds represented by the following formula (2).

[Chem. 2]

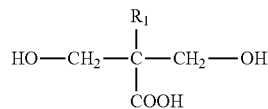

(wherein R$_1$ is a hydrogen atom or a C1-C8 linear or branched alkyl group.)

Examples of the acid group-containing diol compound include: carboxy group-containing aliphatic polyols obtained by reacting succinic acid, adipic acid, or the like with a lower polyol such that two hydroxy groups and one or more carboxy groups remain in the molecule; and carboxy group-containing aromatic polyols obtained by reacting phthalic acid, trimellitic acid, pyromellitic acid, or anhydride of any of them with a lower polyol such that two hydroxy groups and one or more carboxy groups remain in the molecule.

The polyester polyurethane resin may be a reaction product of only the at least one selected from the group of polyester diol compounds represented by the formula (1), hexamethylene diisocyanate, and the acid group-containing diol compound; however, if necessary, a component such as a chain extender or a reaction terminator may be used as a reaction component.

Examples of the chain extender include: glycols such as ethylene glycol, propylene glycol, 1,4-butanediol, 1,6-hexanediol, and diethylene glycol; low molecular weight aliphatic and alicyclic diamines such as ethylenediamine, 1,4-butanediamine, 1,6-hexanediamine, aminoethylethanolamine, and isophoronediamine; and hydrazines such as hydrazine, alkyldihydrazine, and alkyldihydrazide.

Examples of the reaction terminator include: alkylamines such as n-propylamine, n-butylamine, and N,N-di-n-butylamine; alkanolamines such as monoethanolamine and diethanolamine; hydrazines such as hydrazine, alkyldihydrazine, and alkyldihydrazide; and monoalcohols such as methanol and ethanol.

The reaction components for the polyester polyurethane resin may be used alone, or in combination of two or more thereof.

One polyester polyurethane resin synthesized from the above reaction components may be used alone, or two or more polyurethane resins synthesized from different reaction components may be used in combination.

The polyurethane resin may be synthesized using the reaction components by a usual method.

For example, when the reaction components are only a polyester diol compound represented by the formula (1), hexamethylene diisocyanate, and an acid group-containing diol compound, the polyurethane resin may be produced by a method in which all these three components are reacted at once, or a method in which the polyester diol compound represented by the formula (1) and the hexamethylene diisocyanate are reacted under conditions where isocyanate groups are in excess and then the acid group-containing diol compound is reacted.

When the chain extender and the reaction terminator are additionally used, the polyurethane resin may be produced by a method in which the polyester diol compound represented by the formula (1) and the hexamethylene diisocyanate are reacted under conditions where isocyanate groups are in excess to synthesize a urethane prepolymer, subsequently the urethane prepolymer is further reacted with the acid group-containing diol compound and the chain extender under conditions where isocyanate groups are in excess, and then the reaction terminator is reacted, or a method in which all the acid group-containing diol compound, chain extender, and reaction terminator are reacted at once.

The polyester polyurethane resin has a weight average molecular weight (Mw) within the range of preferably 2,000 to 100,000, more preferably 3,000 to 50,000, still more preferably 5,000 to 30,000.

When the polyester polyurethane resin has a weight average molecular weight (Mw) of less than 2,000, the strength of the printed layer may be reduced. When the molecular weight is more than 100,000, even a small amount of the polyester polyurethane resin tends to cause the printing ink to have high viscosity, which may interfere with printed layer formation.

The weight average molecular weight (MW) as used herein can be measured by gel permeation chromatography (GPC). For example, it can be determined as a polystyrene-equivalent weight average molecular weight by chromatography using Water 2690 (produced by Waters Corporation) as a GPC device and PLgel 5μ MIXED-D (produced by Agilent Technologies, Inc.) as a column.

The polyester polyurethane resin has an acid value of preferably 5 to 100 mg KOH/g.

When the acid value is less than 5 mg KOH/g, the dispersibility of the polyester polyurethane resin in an aqueous medium described later may be reduced. When the acid value is more than 100 mg KOH/g, the water resistance or like properties of the printed layer may be reduced.

The polyester polyurethane resin more preferably has an acid value of 5 to 50 mg KOH/g so as to suitably impart laminate strength.

Here, as the acid value of the polyester polyurethane resin is lowered, the polyurethane resin changes from an alkali-soluble aqueous polyurethane resin into a self-emulsifying aqueous polyurethane resin. In order to maintain low viscosity of the printing ink, the polyester polyurethane resin is preferably a self-emulsifying aqueous polyurethane resin.

The self-emulsifying aqueous polyurethane resin refers to a polyurethane resin having an ionic group in the molecule and capable of stably being dispersed in an aqueous medium owing to the ionization of the ionic group.

The acid value as used herein is a theoretical acid value determined by arithmetically determining the number of milligrams of potassium hydroxide theoretically needed to neutralize 1 g of the copolymer resin (the alkali-soluble or self-emulsifying aqueous polyurethane resin described later) based on the composition of the monomers used to synthesize the copolymer resin.

Preferably, the polyester polyurethane resin is dissolved or emulsified in water in the presence of a basic compound and used as an aqueous polyester polyurethane resin varnish.

The polyester polyurethane resin may be dissolved or emulsified in the aqueous medium described later by the following method, for example. First, a basic compound in a substantially neutralizing amount for the polyester polyurethane resin is dissolved in the aqueous medium described later.

Then, the polyester polyurethane resin is added, followed by stirring with a high-speed stirrer.

The basic compound used is not limited, and may be a commonly used basic compound. Examples thereof include: alkylamines such as butylamine and triethylamine; alkanolamines such as monoethanolamine, diethanolamine, and triethanolamine; morpholine; aqueous ammonia; and sodium hydroxide. The amount of the basic compound added is appropriately determined according to the amount, physical properties, and the like of the polyurethane resin used. The basic compounds may be used alone or in combination of two or more thereof.

The amount of the polyester polyurethane resin is appropriately adjusted according to viscosity behavior in the later-described aqueous medium used, components used in combination, desired ink physical properties, and the like. The amount of the polyester polyurethane resin is preferably 1.0 to 10.0% by mass relative to the total mass of the printing ink.

The amount of the polyester polyurethane resin is more preferably 3 to 8% by mass relative to the total mass of the printing ink, so as to impart storage stability and ejection stability to the printing ink and impart laminate strength (peel strength between the base film and the sealant film).

The printing ink preferably contains a colorant, a pigment-dispersing component, and an aqueous medium, in addition to the polyester polyurethane resin.

(Colorant)

The colorant may be any of various inorganic pigments, organic pigments, and dyes commonly used in printing inks.

Examples of inorganic pigments include colored pigments such as titanium oxide, colcothar, Antimony red, Cadmium yellow, Cobalt blue, Prussian blue, ultramarine, carbon black, and graphite, and extenders such as calcium carbonate, kaolin, clay, barium sulphate, aluminum hydroxide, and talc. Examples of organic pigments include soluble azo pigments, insoluble azo pigments, azo lake pigments, condensed azo pigments, copper phthalocyanine pigments, and condensed polycyclic pigments. Examples of dyes include water-soluble dyes such as acidic dyes, direct dyes, and basic dyes.

These may be used alone or in combination of two or more thereof.

When the packaging material of the present invention is used for a food packaging container, the colorant used is preferably a pigment.

(Pigment-Dispersing Component)

Among the above colorants, when a pigment that cannot be directly dispersed in an aqueous medium is used, the pigment is preferably dispersed in an aqueous medium using a low molecular weight or high molecular weight pigment-dispersing component, and used as an ink base.

The low molecular weight pigment-dispersing component may be a known low molecular weight pigment dispersant.

The high molecular weight pigment-dispersing component may be a known high molecular weight resin for dispersing a pigment, for example, but is a polymer compound to which an ionic group (e.g., an acid group) and preferably a group having adsorbability to a pigment surface have been introduced.

Preferably, the high molecular weight pigment-dispersing component is dissolved or dispersed in an aqueous medium in the presence of a compound (e.g., a basic compound) that generates an ion pair with the ionic group of the high molecular weight pigment-dispersing component, and used as an aqueous resin varnish.

Examples of the high molecular weight pigment-dispersing component include various copolymer resins such as acrylic acid resins, styrene-acrylic acid resins, styrene-maleic acid resins, and styrene-acrylic-maleic acid resins. For pigments dispersible in the alkali-soluble or self-emulsifying aqueous polyurethane resin described later, the alkali-soluble or self-emulsifying aqueous polyurethane resin described later may be used as the high molecular weight pigment-dispersing component.

Among monomer components for the synthesis of the above listed copolymer resins, examples of monomers having a carboxy group include acrylic acid, methacrylic acid, crotonic acid, itaconic acid, maleic acid, fumaric acid, 2-carboxyethyl (meth)acrylate, 2-carboxypropyl (meth)acrylate, maleic anhydride, monoalkyl maleate, citraconic acid, citraconic anhydride, and monoalkyl citraconate.

In order to improve the adsorbability to pigments, (meth)acrylates having a C6-C20 long-chain alkyl group are preferred. Particularly preferred among these are, for example, 2-ethylhexyl (meth)acrylate, octyl (meth)acrylate, stearyl (meth)acrylate, lauryl (meth)acrylate, and 2-hydroxystearyl (meth)acrylate. Examples of styrene monomers that can be used include styrene, α-styrene, and vinyltoluene.

Examples of other monomer components that can be used include (meth)acrylates such as methyl (meth)acrylate, ethyl (meth)acrylate, propyl (meth)acrylate, isopropyl (meth)acrylate, butyl (meth)acrylate, and hexyl (meth)acrylate, hydroxyethyl (meth)acrylate, acrylamide, N-methylolacrylamide, cyclohexyl (meth)acrylate, and benzyl (meth)acrylate.

From the standpoint of the dispersibility and dispersion stability of the pigment, the copolymer resin has an acid value of preferably 40 to 300 mg KOH/g, more preferably 70 to 250 mg KOH/g.

Moreover, from the standpoint of the dispersibility and dispersion stability of the pigment and the standpoint of imparting appropriate viscosity, the copolymer resin has a weight average molecular weight (Mw) of preferably 3,000 to 200,000, more preferably 10,000 to 50,000.

The amount of the copolymer resin added is preferably 10 to 200 parts by mass relative to 100 parts by mass of the pigment.

The copolymer resin is dissolved or dispersed in the later-described aqueous medium containing water and an optional water-miscible organic solvent in the presence of a basic compound, and used as an aqueous resin varnish.

The aqueous medium used in the ink base contains water and optionally a water-miscible organic solvent.

The water is preferably ion-exchanged water from which metal ions and the like have been removed, or distilled water.

In order to impart properties such as storage stability, ejection stability, and ink flying properties to the printing ink, the aqueous medium may contain a water-miscible organic solvent such as a monoalcohol, a polyalcohol, a lower alkyl ether of a polyalcohol, a ketone, an ether, an ester, or a nitrogen-containing compound. These may be used alone or in combination of two or more thereof.

The amount of the aqueous medium used in the ink base is preferably 10 to 60 parts by mass, more preferably 15 to 45 parts by mass relative to 100 parts by mass of the ink base.

The colorant is contained in an amount within the range of preferably 0.5 to 20 parts by mass, more preferably 1.0 to 15 parts by mass relative to 100 parts by mass of the printing ink.

(Aqueous Medium)

The printing ink contains an aqueous medium.

The aqueous medium used preferably contains water and an optional component such as a water-miscible organic solvent.

The water-miscible organic solvent is added depending on the solubility of the polyester polyurethane resin and also desired properties such as drying characteristics, moisture retention, or leveling properties during printing.

Any water-miscible organic solvent may be used as long as it does not interfere with the effects of the present invention or damage inkjet printers. Suitable water-miscible organic solvents include monoalcohols, mono- and polyalkylene glycols and alkyl ether compounds thereof, and mono- and polyglycerins and adducts of ethylene oxide therewith.

Specific examples of the monoalcohols include methanol, ethanol, n-propanol, n-butanol, n-pentanol, n-hexanol, n-heptanol, n-octabol, n-nonyl alcohol, n-decanol, isomers of these, cyclopentanol, and cyclohexanol. Preferred are alcohols having a C1-C6 alkyl group.

Specific examples of the mono- and poly-alkylene glycols include ethylene glycol, propylene glycol, 1,3-butylene glycol, 1,4-butylene glycol, 1,2-pentanediol, 1,5-pentanediol, neopentyl glycol, 1,2-hexanediol, 1,6-hexanediol, 1,2-cyclohexanediol, heptanediol, 1,8-octanediol, 1,9-nonanediol, 1,10-decanediol, glycerin, pentaerythritol, diethylene glycol, dipropylene glycol, triethylene glycol, tetraethylene glycol, polyethylene glycol, polypropylene glycol, and thiodiglycol.

Examples of the alkyl ether compounds of mono- and poly-alkylene glycols include ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, dipropylene glycol mono-n-propyl ether, and dipropylene glycol mono-n-butyl ether.

For the aqueous medium, the mixing ratio between the water and the water-miscible organic solvent may also be determined according to the characteristics of the target printing ink. The amount of the water-miscible organic solvent in an aqueous medium is usually preferably 2 to 30% by weight.

(Other Components)

The printing ink may further contain any component depending on the intended purpose. Examples thereof include known additives such as pigment dispersants, surfactants, fungicides, corrosion inhibitors, thickeners, antioxidants, ultraviolet absorbers, preservability improvers, defoamers, and pH adjusters.

(Method for Producing the Printing Ink)

The printing ink may be suitably produced by any of the following methods, for example.

(1) The following materials are mixed: a pigment, an optional pigment-dispersing component (e.g., a low molecular weight pigment-dispersing component or an aqueous resin varnish containing a high molecular weight pigment-dispersing component dissolved in an aqueous medium), an aqueous resin varnish prepared by dissolution or self-emulsification of the polyester polyurethane resin in an aqueous medium, and other component(s).

Next, the pigment is dispersed using a disperser such as a ball mill, an attritor, a roll mill, a sand mill, or an agitator mill. Then, the remaining material(s) (e.g., the aqueous resin varnish prepared by dissolution or self-emulsification of the polyester polyurethane resin in an aqueous medium, or an aqueous medium) are/is optionally added, whereby a printing ink is prepared.

(2) A pigment is dispersed as in the method (1) using the aqueous resin varnish containing a high molecular weight pigment-dispersing component dissolved in an aqueous medium. Subsequently, the high molecular weight pigment-dispersing component is precipitated on the pigment surface by an acid precipitation method or an ion exchange means disclosed in WO 2005/116147 A1, for example, whereby a resin coated pigment is obtained.

The obtained resin coated pigment is neutralized with a basic compound and re-dispersed in an aqueous medium with a disperser (e.g., high-speed stirrer). The remaining material(s) are/is then added, whereby a printing ink is prepared.

(3) The following materials are mixed with a disperser (e.g., high-speed stirrer), whereby a printing ink is prepared: a dye, an aqueous resin varnish prepared by dissolution or self-emulsification of the polyester polyurethane resin in an aqueous medium, an aqueous medium, and optional other component(s).

In particular, when the colorant used is a pigment, the production method (2) is preferred because it allows the printing ink to have better storage stability.

The printing ink obtained as above has an initial viscosity after production of preferably 2.0 to 20.0 mPa·s, more preferably 3.0 to 10.0 mPa·s.

The printing ink is not limited, and examples thereof include spin coating inks; casting inks; dipping inks; plate printing inks such as relief printing inks, intaglio printing inks, offset inks, lithographic inks, relief reverse offset inks, screen inks, and gravure inks; and plateless printing inks such as inkjet inks. From the standpoint of adaptation to a decrease in lot size, preferred is an inkjet ink.

A printed layer may be formed by any printing method using the printing ink. Examples of the printing method include: a spin coating method; a casting method; a dipping method; plate printing methods such as relief printing, intaglio printing, offset printing, lithographic printing, relief reverse offset printing, screen printing, and gravure printing; and plateless printing methods such as an ink-jet method. From the standpoint of adaptation to a decrease in lot size, an ink-jet method is preferably employed. The printing ink is used in fields in which lamination is performed. In many cases, after printing a design with ink compositions of Yellow, Magenta, Cyan, Black, and other colors, white backing is preferably performed on the entire surface with a white ink.

The obtained printed layer has a thickness of preferably 0.01 to 4 μm, more preferably 0.05 to 3 μm, so as to impart sufficient printed image quality and sufficient laminate strength.

<Adhesive Layer>

The adhesive layer is formed of an aliphatic ester adhesive.

The aliphatic ester adhesive has a linear, branched, or cyclic aliphatic group. In order to impart laminate strength, the aliphatic ester adhesive preferably contains a urethane bond or has a primary or secondary isocyanate structure.

Specific examples of the aliphatic ester adhesive include TAKELAC (®) A-626, A-385, and A-315 produced by Mitsui Chemicals, Inc., TAKENATE (®) A-50 produced by Mitsui Chemicals, Inc., DICDRY (®) LX-500/KW-75 produced by DIC Corporation, and DICDRY (®) LX-703VL/KR-90 produced by DIC Corporation.

The application of the aliphatic ester adhesive may be performed using a known dry lamination device equipped with an application device such as a roll coater, a bar coater, or a gravure coater.

The adhesive layer has a thickness of preferably 1 to 6 μm, more preferably 2 to 5 μm.

<Sealant Film>

The sealant film is, for example, formed of a heat sealable thermoplastic resin such as polyethylene, polypropylene, an olefin copolymer, or polyvinyl chloride.

In order to suitably impart gas barrier properties, the sealant film preferably includes a deposition layer mainly containing an inorganic oxide.

The deposition layer contains, for example, one or more inorganic compounds selected from the group consisting of silicon oxide, silicon nitride, silicon oxynitride, silicon oxycarbide, silicon oxycarbonitride, aluminum oxide, aluminum nitride, aluminum oxynitride, and aluminum oxycarbide.

The sealant film is preferably a film obtained by providing the deposition layer on a film formed of cast polyethylene, linear low-density polyethylene, cast polypropylene, an ethylene-vinyl acetate copolymer, or the like. From the standpoint of gas barrier properties and strength, more preferred is an aluminized cast polypropylene film.

The sealant film may have any thickness. Still, the thickness is preferably 10 to 80 μm, more preferably 20 to 60 μm.

<Other Layer(s)>

The packaging material of the present invention may include one or more functional layers between the printed layer and the sealant film so as to improve gas barrier properties and enhance strength.

Examples of the functional layers include layers formed of paper, aluminum, an oriented nylon film, a polyethylene film, an ethylene-vinyl alcohol copolymer film, a polyvinyl chloride film, a polyvinylidene chloride film, or the like.

<Packaging Material>

The packaging material of the present invention having the above-described structure has excellent printed image quality as well as laminate strength and heat sealability even in a case where the materials used are not likely to impart printed image quality, laminate strength, and heat sealability to conventional packaging materials.

The packaging material of the present invention has a laminate strength of preferably 50 g/15 mm or more, more preferably 80 g/15 mm or more, still more preferably 100 g/15 mm or more, particularly preferably 120 g/15 mm or more, most preferably 150 g/15 mm or more.

The laminate strength as used herein is a value of peel strength (dry laminate strength) measured by cutting the packaging material after standing at 40° C. for three days to a width of 15 mm to prepare a specimen and performing T-peeling using a peel tester (produced by Yasuda Seiki Seisakusho, Ltd.).

The packaging material of the present invention has excellent heat sealability. Specifically, the packaging material of the present invention has a seal strength of preferably 1 kg/15 mm or more, more preferably 1.3 kg/15 mm or more, still more preferably 1.5 kg/15 mm or more.

The seal strength as used herein is a value of peel strength measured by cutting a bag made from the packaging material using an impulse sealer (produced by Fujiimpulse Co., Ltd) to a size of 15 mm×100 mm and performing T-peeling using a peel tester (produced by Yasuda Seiki Seisakusho, Ltd) at a tensile speed of 300 mm/min.

The packaging material of the present invention can be obtained by forming a primer layer by applying the primer composition to one surface of the base film, subsequently forming a printed layer by printing the printing ink on a surface of the primer layer, subsequently applying an aliphatic ester adhesive to a surface of the printed layer to form an adhesive layer, and then laminating a sealant film.

The packaging material obtained by the above method may be formed into a bag by a method including folding the packaging material in the middle such that the sealant film side is on the side of the container, or laminating the composite films, and then hot-melting and pressure-bonding the ends using a heat sealer or the like. The packaging material may be used for packaging containers of various heat sealing modes, such as three-side sealing, four-side sealing, lap sealing, fin sealing, and gusset sealing.

EXAMPLES

The present invention is more specifically described hereinbelow referring to, but not limited to, examples. The "part(s)" and "%" in examples and comparative examples are on the mass basis unless otherwise specified.

<Base Film>

OPP (biaxially oriented polypropylene film, PYLEN Film-OT P-2161, thickness of 25 μm, produced by Toyobo co., Ltd.) PET (biaxially oriented polyester film, E-5102, thickness of 12 μm, produced by Toyobo co., Ltd.)

<Primer Composition>

Water-soluble polyvalent metal salt (calcium acetate, calcium formate)

Chlorinated polyolefin emulsion (SUPERCHLON E-604, chlorination degree of 21%, produced by Nippon Paper Industries Co., Ltd.)

Acrylic emulsion (VINYBLAN 2687, glass transition temperature of 20° C., produced by Nissin Chemical Co., Ltd.)

Vinyl acetate emulsion (VINYBLAN 1129, produced by Nissin Chemical Co., Ltd.)

Urethane-modified polyester resin (Impranil DLS, glass transition temperature of −51° C., produced by Covestro AG)

Urethane-modified polyether resin (NeoRez R650, produced by DSM)

Urethane-modified polycarbonate resin (NeoRez R986, produced by DSM)

Surfactant (Olfine E1010, 100% active ingredient, HLB13, produced by Nissin Chemical Co., Ltd.)

Water

The materials were blended as shown in Table 1 and stirred to be mixed. Thus, primer compositions P1 to P12 were produced.

TABLE 1

| | Primer composition | | | | | | | | | | | |
|---|---|---|---|---|---|---|---|---|---|---|---|---|
| | P1 | P2 | P3 | P4 | P5 | P6 | P7 | P8 | P9 | P10 | P11 | P12 |
| Calcium acetate (solid content) | 2 | 0.5 | 10 | 2 | 2 | 2 | 2 | — | 2 | 2 | 2 | 2 |
| Calcium formate (solid content) | — | — | — | — | — | — | — | 2 | — | — | — | — |
| Chlorinated polyolefin emulsion (solid content) | 2 | 2 | 2 | 2 | 2 | 2 | 2 | 2 | — | 2 | 2 | 2 |
| Acrylic emulsion (solid content) | 5 | 5 | 5 | — | 0.5 | 10 | — | 5 | 5 | — | — | — |
| Vinyl acetate emulsion (solid content) | — | — | — | 5 | — | — | — | — | — | — | — | — |
| Urethane-modified polyester resin (solid content) | — | — | — | — | — | — | 5 | — | — | — | — | — |
| Urethane-modified polyether resin (solid content) | — | — | — | — | — | — | — | — | — | — | 5 | — |
| Urethane-modified polycarbonate resin (solid content) | — | — | — | — | — | — | — | — | — | — | — | 5 |
| Surfactant | 0.5 | 0.5 | 0.5 | 0.5 | 0.5 | 0.5 | 0.5 | 0.5 | 0.5 | 0.5 | 0.5 | 0.5 |
| Water | 90.5 | 92 | 82.5 | 90.5 | 95 | 85.5 | 90.5 | 90.5 | 92.5 | 95.5 | 90.5 | 90.5 |
| Total (parts by mass) | 100 | 100 | 100 | 100 | 100 | 100 | 100 | 100 | 100 | 100 | 100 | 100 |

<Printing Ink>

The following polyester polyurethane resin varnishes A to C were produced as polyester polyurethane resins.

(Polyester Polyurethane Resin Varnish A)

A pressure polymerization vessel equipped with a thermometer and a stirrer was charged with 200.0 parts by mass of a polyester diol that was obtained by dehydration copolymerization of 1,6-hexanediol and phthalic acid and had a weight average molecular weight (Mw) of 2,000, 5.4 parts by mass of dimethylolpropionic acid, 21.9 parts by mass of hexamethylene diisocyanate, and 265.5 parts by mass of methyl ethyl ketone. They were reacted at 75° C. for seven hours.

Thereafter, 3.9 parts by mass of triethylamine and 539.5 parts by mass of pure water were added and the methyl ethyl ketone was distilled under reduced pressure, whereby a polyester polyurethane resin varnish A was obtained. The polyester polyurethane resin varnish A contained, as a solid content, 30% of a self-emulsifying polyurethane resin having a weight average molecular weight (Mw) of 24,000 and a theoretical acid value of 9.9 mg KOH/g.

(Polyester Polyurethane Resin Varnish B)

A pressure polymerization vessel equipped with a thermometer and a stirrer was charged with 200.0 parts by mass of a polyester diol that was obtained by dehydration copolymerization of 3-methyl-1,5-pentanediol and phthalic acid and had a weight average molecular weight (Mw) of 2,000, 5.4 parts by mass of dimethylolpropionic acid, 21.9 parts by mass of hexamethylene diisocyanate, and 265.5 parts by mass of methyl ethyl ketone. They were reacted at 75° C. for seven hours.

Thereafter, 3.9 parts by mass of triethylamine and 539.5 parts by mass of pure water were added and the methyl ethyl ketone was distilled under reduced pressure, whereby a polyester polyurethane resin varnish B was obtained. The polyester polyurethane resin varnish B contained, as a solid content, 30% of a self-emulsifying polyurethane resin having a weight average molecular weight (Mw) of 24,000 and a theoretical acid value of 9.9 mg KOH/g.

(Polyester Polyurethane Resin Varnish C)

A pressure polymerization vessel equipped with a thermometer and a stirrer was charged with 200.0 parts by mass of a polyester diol that was obtained by dehydration copolymerization of a diol component having a mass ratio of 1,6-hexanediol and 3-methyl-1,5-pentanediol of 1:1 and phthalic acid and had a weight average molecular weight (Mw) of 2,000, 5.4 parts by mass of dimethylolpropionic acid, 21.9 parts by mass of hexamethylene diisocyanate, and 265.5 parts by mass of methyl ethyl ketone. They were reacted at 75° C. for seven hours.

Thereafter, 3.9 parts by mass of triethylamine and 539.5 parts by mass of pure water were added and the methyl ethyl ketone was distilled under reduced pressure, whereby a polyester polyurethane resin varnish C was obtained. The polyester polyurethane resin varnish C contained, as a solid content, 30% of a self-emulsifying polyurethane resin having a weight average molecular weight (Mw) of 25,000 and a theoretical acid value of 9.9 mg KOH/g.

The weight average molecular weight (Mw) was determined as a polystyrene-equivalent weight average molecular weight by chromatography using Water 2690 (produced by Waters Corporation) as a GPC device and PLgel 5p MIXED-D (produced by Polymer Laboratories) as a column.

The theoretical acid value means the number of milligrams of potassium hydroxide theoretically needed to neutralize 1 g of the polyurethane resin, arithmetically determined based on factors such as the molecular weight of the carboxy group-containing compound used as a synthesis component of the polyurethane resin, the mixing ratio of the compound, and the number of carboxy groups in the molecule of the compound.

The following resins were provided for comparison.

Urethane-modified polyether resin (NeoRez R-966, produced by DSM)

Urethane-modified polycarbonate resin (Superflex 420NS, produced by Dai-Ichi Kogyo Seiyaku Co., Ltd.)

Acrylic emulsion (YODOSOL AD173, produced by Henkel)

(Pigment-Dispersing Component)

The following aqueous resin varnish was produced as a pigment-dispersing component.

An amount of 2.5 parts by mass of potassium hydroxide was dissolved in 77.5 parts by mass of water, and in the solution was dissolved 20 parts by mass of an acrylic acid/n-butyl acrylate/benzyl methacrylate/styrene copolymer having a glass transition temperature of 40° C., a weight average molecular weight (Mw) of 30,000, and an acid value of 185 mg KOH/g. Thus, an aqueous resin varnish having a solid content of 20% was obtained.

Colorants, the pigment-dispersing component, and an aqueous medium were mixed to prepare aqueous ink bases.

(Preparation of Yellow)

An amount of 23.7 parts by mass of the aqueous resin varnish and 64.3 parts by mass of water were mixed to prepare a resin varnish for pigment dispersion. The varnish and 12 parts by mass of a yellow pigment (product name: Novoperm Yellow 4G 01, produced by Clariant) were stirred and mixed, and then kneaded in a wet-type circulation mill, whereby an aqueous ink base (yellow) was obtained.

(Preparation of Magenta)

An amount of 23.7 parts by mass of the aqueous resin varnish and 64.3 parts by mass of water were mixed to prepare a resin varnish for pigment dispersion. The varnish and 12 parts by mass of a magenta pigment (product name: Ink Jet Magenta E5B 02, produced by Clariant) were stirred and mixed, and then kneaded in a wet-type circulation mill, whereby an aqueous ink base (magenta) was obtained.

(Preparation of Cyan)

An amount of 23.7 parts by mass of the aqueous resin varnish and 64.3 parts by mass of water were mixed to prepare a resin varnish for pigment dispersion. The varnish and 12 parts by mass of a cyan pigment (product name: Heliogen Blue L 7101 F, produced by BASF SE) were stirred and mixed, and then kneaded in a wet-type circulation mill, whereby an aqueous ink base (cyan) was obtained.

(Preparation of Black)

An amount of 23.7 parts by mass of the aqueous resin varnish and 64.3 parts by mass of water were mixed to prepare a resin varnish for pigment dispersion. The varnish and 12 parts by mass of carbon black (product name: Printex 90, produced by Degussa) were stirred and mixed, and then kneaded in a wet-type circulation mill, whereby an aqueous ink base (black) was obtained.

(Preparation of White)

An amount of 40.0 parts by mass of the aqueous resin varnish and 20.0 parts by mass of water were mixed to prepare a resin varnish for pigment dispersion. The varnish and 40 parts by mass of titanium oxide (product name: R-960, produced by Du Pont) were stirred and mixed, and then kneaded in a wet-type circulation mill, whereby an aqueous ink base (white) was obtained.

Surfactant (Surfynol 465, solid content of 100%, HLB 13, produced by EVONIK)

Propylene Glycol

Water

The above materials were blended as shown in Table 2, and stirred to be mixed. Thus, printing inks 1 to 13 were produced.

TABLE 2

| | | Printing ink | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Aqueous ink base | Yellow (colorant: 12%) | — | 34 | — | — | — | — | — | — | — | — | — | — | — |
| | Magenta (colorant: 12%) | — | — | 34 | — | — | — | — | — | — | — | — | — | — |
| | Cyan (colorant: 12%) | — | — | — | 25 | — | — | — | — | — | — | — | — | — |
| | Black (colorant: 12%) | 34 | — | — | — | — | 34 | 34 | 34 | 34 | 34 | 34 | 34 | 34 |
| | White (colorant: 40%) | — | — | — | — | 25 | — | — | — | — | — | — | — | — |
| Polyester polyurethane resin (solid content) | Varnish A | 5 | 5 | 5 | 5 | 5 | 1 | 10 | — | — | — | — | — | — |
| | Varnish B | — | — | — | — | — | — | — | 5 | — | — | — | — | — |
| | Varnish C | — | — | — | — | — | — | — | — | 5 | — | — | — | — |
| Urethane-modified polyether resin (solid content) | | — | — | — | — | — | — | — | — | — | — | 5 | — | — |
| Urethane-modified polycarbonate resin (solid content) | | — | — | — | — | — | — | — | — | — | — | — | 5 | — |
| Acrylic emulsion (solid content) | | — | — | — | — | — | — | — | — | — | — | — | — | 5 |
| Surfactant | | 1 | 1 | 1 | 1 | 1 | 1 | 1 | 1 | 1 | 1 | 1 | 1 | 1 |
| Propylene glycol | | 35 | 35 | 35 | 40 | 35 | 40 | 30 | 30 | 30 | 40 | 35 | 30 | 35 |
| Water | | 25 | 25 | 25 | 29 | 34 | 24 | 25 | 30 | 30 | 25 | 25 | 30 | 25 |
| Total (parts by mass) | | 100 | 100 | 100 | 100 | 100 | 100 | 100 | 100 | 100 | 100 | 100 | 100 | 100 |

<Adhesive>
A315/A50 (aliphatic polyester adhesive, solution of TAKELAC A-315/TAKENATE A-50 in ethyl acetate, produced by Mitsui Chemicals, Inc.)
A385/A50 (aliphatic polyester adhesive, solution of TAKELAC A-385/TAKENATE A-50 in ethyl acetate, produced by Mitsui Chemicals, Inc.)
A969/A5 (aromatic polyether adhesive, solution of TAKELAC A-969V/TAKENATE A-5 in ethyl acetate, produced by Mitsui Chemicals, Inc.)
A515/A3 (aromatic polyester adhesive, solution of TAKELAC A-515/TAKENATE A-3 in ethyl acetate, produced by Mitsui Chemicals, Inc.)
<Sealant Film>
CPP (cast polypropylene film, PYLEN Film-CT P-1128, thickness of 25 μm, produced by Toyobo co., Ltd.)
VM-CPP (aluminized cast polypropylene film, thickness of 25 μm, produced by Mitsui Chemicals Tohcello, Inc.)

Examples 1 to 22, Comparative Examples 1 to 15

Packaging materials of Examples 1 to 22 and Comparative Examples 1 to 15 were produced using materials shown in Table 3 by the following method.
Corona discharge treatment was performed on one surface of a base film, and the primer composition was applied to the treated surface to form a primer layer having a thickness of 0.3 μm.
Next, on the primer layer surface was performed printing using a printer PX105 (produced by Seiko Epson Corp.) including cartridges filled with printing inks, whereby a printed layer having a thickness of 2 μm was formed.
Then, the adhesive was applied to the printed layer surface to form an adhesive layer having a dry thickness of 5 μm, and the sealant film was laminated thereon (in the case of including a deposition layer, the sealant film was laminated such that the deposition layer side surface was in contact with the adhesive layer). Thus, a packaging material was produced.
<Evaluation of Packaging Material>
(Laminate Strength)
The packaging materials of Examples 1 to 22 and Comparative Examples 1 to 15 after standing at 40° C. for three days were each cut to a width of 15 mm to prepare a specimen.

The specimen was subjected to T-peeling using a peel tester (produced by Yasuda Seiki Seisakusho, Ltd.) to determine the peel strength between the base film and the sealant film. The laminate strength was evaluated based on the following criteria.

Good: The strength upon peeling of the packaging material was more than 100 g/15 mm.

Fair: The strength upon peeling of the packaging material was not less than 50 g/15 mm and not more than 100 g/15 mm.

Poor: The strength upon peeling of the packaging material was less than 50 g/15 mm.

(Heat Sealability)

The packaging materials of Examples 1 to 22 and Comparative Examples 1 to 15 were each formed into a bag using an impulse sealer (produced by Fujiimpulse Co., Ltd.), and the resulting bag was cut to a size of 15 mm×100 mm to prepare a specimen.

Then, the specimen was subjected to T-peeling using a peel tester (produced by Yasuda Seiki Seisakusho, Ltd.) at a tensile speed of 300 mm/min to determine the seal strength. The heat sealability was evaluated based on the following criteria.

Good: The seal strength was 1 kg/15 mm or more.

Poor: The seal strength was less than 1 kg/15 mm.

(Printed Image Quality)

The packaging materials of Examples 1 to 22 and Comparative Examples 1 to 15 were each visually observed for thickening of a thin line due to blurring of the printed layer, and the printed image quality was evaluated based on the following criteria.

The printed layer used was a printed thin line having a width of 0.3 mm.

Good: No blurring was observed, and the thin line was printed with the original width.

Fair: The thin line was partially widened to less than twice the original width.

Poor: The entire line was widened to twice or more the original width.

TABLE 3

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Printing ink | 1 | 2 | 3 | 4 | 5 | 6 | 7 | 8 | 9 | 1 |
| Primer composition | P1 | P1 | P1 | P1 | P1 | P1 | P1 | P1 | P1 | P2 |
| Base film | OPP | OPP | OPP | OPP | OPP | OPP | OPP | OPP | OPP | OPP |
| Sealant film | VM-CPP | VM-CPP | VM-CPP | VM-CPP | VM-CPP | VM-CPP | VM-CPP | VM-CPP | VM-CPP | VM-CPP |
| Adhesive | A315/A50 | A315/A50 | A315/A50 | A315/A50 | A315/A50 | A315/A50 | A315/A50 | A315/A50 | A315/A50 | A315/A50 |
| Laminate strength | Good 130 | Good 150 | Good 120 | Good 150 | Good 120 | Fair 90 | Good 150 | Good 120 | Good 110 | Good 130 |
| Heat sealability | Good 1.3 | Good 1.6 | Good 1.2 | Good 1.4 | Good 1.3 | Good 1.3 | Good 1.4 | Good 1.3 | Good 1.3 | Good 1.3 |
| Printed image quality | Good | Good | Good | Good | Good | Good | Good | Good | Good | Good |

| | Example 11 | Example 12 | Example 13 | Example 14 | Example 15 | Example 16 | Example 17 | Example 18 | Example 19 |
|---|---|---|---|---|---|---|---|---|---|
| Printing ink | 1 | 1 | 1 | 1 | 1 | 1 | 1 | 1 | 1 |
| Primer composition | P3 | P4 | P5 | P6 | P7 | P1 | P1 | P1 | P1 |
| Base film | OPP | OPP | OPP | OPP | OPP | PET | PET | OPP | PET |
| Sealant film | VM-CPP | VM-CPP | VM-CPP | VM-CPP | VM-CPP | CPP | VM-CPP | VM-CPP | CPP |
| Adhesive | A315/A50 | A315/A50 | A315/A50 | A315/A50 | A315/A50 | A315/A50 | A315/A50 | A385/A50 | A385/A50 |
| Laminate strength | Good 110 | Good 130 | Fair 90 | Good 140 | Good 150 | Good 180 | Good 100 | Good 120 | Good 170 |
| Heat sealability | Good 1.3 | Good 1.3 | Good 1.3 | Good 1.3 | Good 1.5 | Good 1.5 | Good 1.3 | Good 1.5 | Good 1.5 |
| Printed image quality | Good | Good | Good | Good | Good | Good | Good | Good | Good |

| | Example 20 | Example 21 | Example 22 | Comparative Example 1 | Comparative Example 2 | Comparative Example 3 | Comparative Example 4 | Comparative Example 5 | Comparative Example 6 |
|---|---|---|---|---|---|---|---|---|---|
| Printing ink | 1 | 1 | 1 | 1 | 10 | 11 | 12 | 13 | 1 |
| Primer composition | P1 | P8 | P8 | なし | P1 | P1 | P1 | P1 | P1 |
| Base film | PET | OPP | PET | OPP | OPP | OPP | OPP | OPP | OPP |
| Sealant film | VM-CPP | VM-CPP | VM-CPP | VM-CPP | VM-CPP | VM-CPP | VM-CPP | VM-CPP | VM-CPP |
| Adhesive | A385/A50 | A315/A50 | A315/A50 | A315/A50 | A315/A50 | A315/A50 | A315/A50 | A315/A50 | A969/A5 |
| Laminate strength | Good 110 | Good 130 | Good 100 | — | Poor 15 | Poor 20 | Poor 15 | Poor 15 | Poor 40 |
| Heat sealability | Good 1.5 | Good 1.3 | Good 1.3 | — | Good 1.3 | Good 1.3 | Good 1.3 | Good 1.3 | Good 1.2 |
| Printed image quality | Good | Good | Good | Poor | Good | Good | Good | Good | Good |

| | Comparative Example 7 | Comparative Example 8 | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|---|
| Printing ink | 1 | 1 | 1 | 1 | 1 | 1 | 1 | 1 | 1 |
| Primer composition | P1 | P1 | P1 | P1 | P1 | P9 | P10 | P11 | P12 |
| Base film | OPP | PET | PET | PET | PET | OPP | OPP | OPP | OPP |
| Sealant film | VM-CPP | CPP | CPP | VM-CPP | VM-CPP | VM-CPP | VM-CPP | VM-CPP | VM-CPP |
| Adhesive | A515/A3 | A969/A5 | A515/A3 | A969/A5 | A515/A3 | A315/A50 | A315/A50 | A315/A50 | A315/A50 |
| Laminate strength | Poor 40 | Poor 40 | Poor 40 | Poor 40 | Poor 40 | Poor 15 | Poor 20 | Poor 40 | Poor 40 |
| Heat sealability | Good 1.1 | Good 1.2 | Good 1.1 | Good 1.3 | Good 1.1 | Good 1.3 | Good 1.3 | Good 1.3 | Good 1.3 |
| Printed image quality | Good | Good | Good | Good | Good | Good | Good | Good | Good |

It was confirmed that the packaging materials of the examples had excellent printed image quality as well as laminate strength and heat sealability even in the case of including, as a base film or a sealant film, an oriented or cast polypropylene film, an oriented or cast polyester film, a polypropylene film including an inorganic oxide-deposited layer, or the like.

In contrast, in the packaging material of Comparative Example 1 including no primer layer, blurring of the printed layer occurred and widening of the thin line to twice or more the original width was observed. Moreover, layers are not sufficiently bonded to each other, and therefore, evaluation on the laminate strength and heat sealability could not be performed.

In the case of the packaging materials of Comparative Examples 2 to 5 which were produced using a printing ink containing no polyester polyurethane resin, the laminate strength was insufficient.

In the case of the packaging materials of Comparative Examples 6 to 11 including no adhesive layer formed of an aliphatic ester adhesive, the laminate strength was insufficient too.

The laminate strength was also insufficient in Comparative Example 12 in which the primer layer contained no chlorinated polyolefin emulsion, Comparative Example 13 in which the primer layer did not contain the at least one selected from the group consisting of an acrylic emulsion, a vinyl acetate emulsion, and a urethane-modified polyester resin, Comparative Example 14 in which the at least one selected from the group consisting of an acrylic emulsion, a vinyl acetate emulsion, and a urethane-modified polyester resin was replaced by a urethane-modified polyether in the primer layer, and Comparative Example 15 in which the at least one selected from the group consisting of an acrylic emulsion, a vinyl acetate emulsion, and a urethane-modified polyester resin was replaced by a urethane-modified polycarbonate in the primer layer.

INDUSTRIAL APPLICABILITY

The packaging material of the present invention has excellent printed image quality as well as excellent laminate strength and heat sealability, and therefore is widely usable in the field of packaging materials for food, drugs, or the like.

The invention claimed is:

1. A packaging material comprising at least: a base film; a primer layer; a printed layer; an adhesive layer; and a sealant film in a stated order,
   the primer layer being formed of a primer composition containing a water-soluble polyvalent metal salt, a chlorinated polyolefin emulsion, and at least one urethane-modified polyester resin,
   the printed layer being formed of a printing ink containing a polyester polyurethane resin,
   the adhesive layer being formed of an aliphatic ester adhesive.

2. The packaging material according to claim 1,
   wherein the aliphatic ester adhesive contains a urethane bond.

3. The packaging material according to claim 1,
   wherein the base film is a polypropylene film or a polyester film.

4. The packaging material according to claim 1,
   wherein the sealant film is an aluminized polypropylene film.

* * * * *